United States Patent Office 2,816,854
Patented Dec. 17, 1957

2,816,854

NUTRITION AID

Ralph H. Gross, Fort Lauderdale, Fla.

No Drawing. Application May 26, 1953,
Serial No. 357,616

9 Claims. (Cl. 167—81)

This invention relates to an improved composition and method of use adapted as an aid in nutrition and building of non-specific immunity to infectious diseases for a warm blooded living body.

The composition hereof is composed of two factors, the first of which is adapted as an astringent substance, which appears to increase the metabolic activity of the body and resulting phagocytosis to increase resistance to certain diseases characterized by enteritis of the digestive tract generally caused by ingestion of harmful bacteria or protozoa. The second factor is a vitamin A concentrate which in itself tends to raise the immunity of the body to such diseases, but primarily in the combination hereof, tends to aid in the assimilation of nutrition to cooperate with the enhanced metabolic activity of the astringent substance. The use of both factors of the composition tends to aid the nutrition, building weight, particularly in the bodies of animals while substantially raising their general immunity to infectious diseases attacking the body through the digestive tract.

In the feeding of animals with the combined factors hereof, it is preferable that they be given the astringent substance prior to feeding and the vitamin after the feeding for optimum cooperative effect of each. However, substantially improved feeding is obtained by feeding the animal the combination of both substances as a tablet but it is more convenient to associate these factors with the food which is ingested by the animal. A useful form is to associate the astringent with a first portion of food and the vitamin with a second portion of food for each feeding.

Where the two factors are associated into a single composition they are desirably in a solid wax-like carrier substance which tends to slow the absorption of each while acting as a protective carrier both for the water soluble astringent and for the readily oxidizable fat soluble vitamin A. Such carrier, moreover, allows ready combination with other vitamins, stabilizers, and desirable minerals. As shown in British Patents 681,931 and 681,930 the waxy carrier can be formed into very small spheroidal particles allowing accurate quantitative introduction thereof into an animal food base for the vitamin A and, for purposes hereof, astringent substance for which it is caused to serve as a carrier.

The dosage will vary with the normal weight of the animal. For example, for poultry, the astringent may be fed in proportions of about 10 to 20 grains preferably about 15 grains per feeding and the vitamin A will be fed in proportions of 20,000 to 30,000 U. S. P. units per feeding. For larger animals the dosage is increased proportionally. For example, for a ruminant animal the dosage will be increased several fold. For example, a cow would be fed a minimum of about 25 grains of astringent ranging upwardly to 100 grains of astringent per feeding and the vitamin would range upwardly from 25,000 to 150,000 units per feeding. Such proportions for animals are adjusted to allow continuous gain of weight, but where gain of weight is not essential or is undesirable, the dosage would be substantially reduced to approximately 10 to 15 grains of astringent and 25,000 U. S. P. units of vitamin A for a daily dosage.

Any astringent substance may be used as the astringent providing it is generally non-toxic but I prefer one which is substantially water soluble, and which contains salts desirably assimilated by the body. Thus for astringent, I use an alum such as the double alkali metal salt with aluminum existing as a sulfate. Such alkali metals as sodium, potassium, lithium or ammonium may be used, but the most desirable form readily assimilated is the potassium alum. While vitamin A in this composition is essential to complement the enhanced metabolic activity caused by astringent substance, other fat soluble vitamins may be present particularly vitamin $D_2$ and water soluble vitamins as vitamin B, as complex vitamins $B_1$ through $B_6$ and vitamin $B_{12}$, and vitamins C and K may be added. Also minute portions of trace elements having known desirability in nutrition may likewise be present. The vitamin A will usually be used in the alcohol or ester form and is generally combined with an anti-oxidant such as hydroquinone, but tocopherols may serve this purpose. In tablet form excipients such as starch, lactose, dextrin, talcum, or acacia are usually added. Where a waxy carrier is used any of the hydrogenated vegetable oils such as hydrogenated cotton seed oil or soya bean oil may be used with or without fatty stabilizers such as lecithin.

The following examples illustrate the practice of this invention.

Example 1

Factor 1.—15 grain pill of compressed powder moistened with a trace of a binder composition such as a 10% dextrin in water and pressed to a 15 grain tablet.

Factor 2.—The following composition after homogeneous mixing is assembled into a capsule in proportions as given:

| Ingredient: | Quantity |
|---|---|
| Vitamin A (palmitate) | 25,000 U. S. P. units. |
| Vitamin D (irradiated ergosterol) | 1,600 U. S. P. units. |
| Thiamine hydrochloride U. S. P. ($B_1$) | 10 mg. |
| Riboflavin U. S. P. ($B_2$) | 5 mg. |
| Pyridoxine hydrochloride ($B_4$) | 1.25 mg. |
| Ascorbic acid U. S. P. (C) | 150 mg. |
| Niacin amide U. S. P. | 150 mg. |
| Calcium pantothenate | 10 mg. |
| Vitamin $B_{12}$ crystalline (U. S. P.) | 6 mcg. |
| Folic acid U. S. P. | 0.34 mg. |
| Ferrous sulfate dried U. S. P. (equivalent to 15 mg. of iron) | 51 mg. |
| Calcium (from dicalcium phosphate anhyd.) | 28.8 mg. |
| Phosphorus (from dicalcium phosphate anhyd.) | 22.3 mg. |
| Iodine (from potassium iodide) | 0.15 mg. |
| Manganese (from manganese sulfate) | 1.5 mg. |
| Cobalt (from cobalt sulfate) | 0.15 mg. |
| Molybdenum (from sodium molybdate) | 0.5 mg. |
| Copper (from copper sulfate) | 1 mg. |
| Magnesium (from magnesium sulfate) | 10 mg. |
| Zinc (from zinc sulfate) | 1 mg. |

Example 2

Factor 1 and factor 2 without compression into tablet form are homogeneously intermixed as powders and filled into a single capsule in the proportions given.

Example 3

For use in a chicken feed factor 1 comprising potassium alum is mixed with calcium carbonate grits in a ratio of 15 grains per pound and fed to chickens. The feeding was completed with cracked corn with which was homogeneously mixed the factor 2 in the proportions given in example 1 per pound of cracked corn. During the life feeding of several thousand chickens on this diet, the chickens gained rapidly in weight and no instance of loss due to a specific infectious disease was found.

Example 4

In an alternate feeding of chickens the combined factors 1 and 2 as set forth in Example 2 were mixed in the proportions of said example with a pound of cracked corn and fed to several thousand chickens again with no instance of loss of chickens due to any specific infectious disease but the rate of weight gained by this group of chickens was not quite as rapid where the astringent factor and vitamin factor were supplied in separate feeds.

Example 5

A finely powdered dry mix of factor 1 and factor 2 in proportions as set forth in Example 1 are dissolved and suspended in molten hydrogenated cotton seed oil by first melting the fat at a temperature of about 75–80° C. and stirring into it the dry powdered mixture in proportions of 10 parts of fat to 1 part of powdered mixture. The liquid suspension is then finely sprayed as a liquid melt upon cracked corn in the proportions given in Examples 3 and 4 and the corn used as chicken feed.

Example 6

Separate tablets were made up as in Example 1 of factors 1 and 2 and prior to each feeding dogs were fed factor 1 followed by a normal meal and then fed a capsule containing the composition of factor 2 set forth in Example 1. The dogs were found to thrive, gain weight, and exhibited no instance of important illness over long periods of time. Their condition of health seemed extraordinarily fine by being continuously energetic.

Example 7

A cooked cereal mash comprising a mixture of crushed whole wheat and oats cooked soft with water was partially dried to about 12% moisture content and then homogeneously mixed with the powdered composition of Example 2 and then used as a dog food, with substantially the same effect as noted in Example 6.

Example 8

Chopped lengths of alfalfa are sprayed with an aqueous slurry of a mixture of both factors 1 and 2 as set forth in Example 2 per pound of alfalfa. A herd of cattle fed on a continuous died including this alfalfa showed continuous gain of weight slightly more rapid than might be considered normal in the herd but no instance of infectious disease was found in the herd.

While it is believed that the astringent substance operates to increase the metabolic activity and consequent phagocytosis while conditioning the digestive tract to resist enteritis, applicant does not intend to be limited to any specific theory. Improved immunity to infectious disease, particularly such as are encountered by animals bred under conditions where ultimate sanitation is not possible, is evident in the use of the astringent factor, but in the absence of combined use of the astringent substance with vitamin A the animal will lose weight. While as is known, enhanced nutrition is available and certain specific vitamin deficiency diseases are overcome by use of vitamins generally, no general disease immunity results therefrom.

Certain modifications will occur to those skilled in the art. The compositions may be taken in sequence, the preferred method of medication, or combined into a single dosage as a powder or tablet or capsule form. Preferably in animal treatment, the medication is combined in the animal food as set forth.

I claim:

1. A nutritional aid useful in veterinarian treatment for increasing the immunity of warm blooded animals to non-specific diseases of the digestive tract, comprising the combination of at least about 10 grains of astringent substance and at least about 20,000 U. S. P. units of vitamin A, per feeding.

2. The method of increasing the weight and immunity to non-specific diseases of the digestive tract of warm blooded animals in veterinarian treatment thereof, comprising adding to the food of the animal at least about 10 grains of an astringent substance and at least about 20,000 U. S. P. units of vitamin A, per feeding.

3. A domestic animal food product containing homogeneously distributed therein at least about 10 grains of a non-toxic astringent substance and at least about 20,000 U. S. P. units of vitamin A per feeding.

4. A domestic animal food product comprising at least about 10 grains of an alum and at least about 20,000 U. S. P. units of vitamin A, per feeding, homogeneously distributed therein.

5. A domestic animal food product comprising at least about 10 grains of potassium alum and at least about 20,000 U. S. P. units of vitamin A, per feeding, homogeneously distributed therein.

6. A nutritional aid useful in veterinarian treatment for increasing the immunity of warm blooded animals to non-specific diseases of the digestive tract, comprising the combination of at least about 10 grains of potassium alum and at least about 20,000 U. S. P. units of vitamin A, per feeding.

7. The method of promoting the growth and imparting substantial immunity to infectious diseases originating in warm blooded animals in the veterinarian treatment thereof, comprising ingesting a dosage of at least 10 grains of an astringent substance prior to feeding, feeding the animal a normal meal and then ingesting 20,000 U. S. P. units of vitamin A following the meal.

8. A nutritional aid useful in the veterinarian treatment to increase the weight and immunity to non-specific diseases of the digestive tract of warm blooded animals comprising 10 to 30 grains of an alum of 25,000 to 150,000 U. S. P. units of vitamin A, per feeding.

9. Nutritional aid as defined in claim 8 further containing food fortification quantities of vitamin B complex, vitamin C, vitamin D and trace quantities of essential minerals.

References Cited in the file of this patent

UNITED STATES PATENTS

| 1,897,039 | Christiansen | Feb. 14, 1933 |
| 2,359,413 | Freedman | Oct. 3, 1944 |

FOREIGN PATENTS

| 387,958 | Great Britain | Feb. 16, 1933 |

OTHER REFERENCES

The Vitamins (1939), publ. by A. M. A., pp. 36, 37.
Milks: Veterinary Pharmacology, Materia Medica and Therapeutics, 6th ed., 1949, pp. 253, 254, 258, 259, 551.